United States Patent Office
3,435,687
Patented Apr. 1, 1969

3,435,687
VIBRATING GYROMETERS
Raymond Mathey, Bernard Picardat, and Robert Lecocq, Paris, France, assignors to CSF-Compagnie Generale de Telegraphie Sans Fil, a corporation of France
Filed Feb. 16, 1966, Ser. No. 527,824
Int. Cl. G01p *15/10*
U.S. Cl. 73—505                    3 Claims

ABSTRACT OF THE DISCLOSURE

A gyrometer for measuring the angular velocity component about an axis comprising a conductive vibrating string parallel to this axis and vibrating in a D.C. magnetic field perpendicular thereto. Windings are provided for applying to this string an A.C. magnetic field perpendicular to the string and to the D.C. field. A self-oscillating system is connected to this string for keeping it vibrating at its resonance frequency. An impedance having a zero admittance at the resonance frequency of the string and an infinite admittance at both side frequencies of the modulated signal induced in the string is connected, in series with an A.C. current measuring means, across this string.

---

The present invention relates to gyrometers which are used for detecting the absolute angular velocity of rotation about an axis, for example, in piloting and missile stabilizing systems.

This type of instrument is based on the measure of the complementary Coriolis acceleration, which is given by the vector product of a relative velocity and an angular velocity.

In rotary gyrometers, a rotor is rotated at a very high speed in order to produce a high gyroscopic effect. The construction of an accurate instrument of this type with an acceptable useful life sets a number of delicate problems, because the sensitive mass reaches a rotation speed of several hundred revolutions per second.

In vibrating gyrometers, the Coriolis's acceleration responsive body is formed by a vibratory structure resiliently fixed to a frame and means are provided for causing it to vibrate and for detecting the perturbation of the dynamic equilibrium resulting from the angular velocity.

It is an object of the invention to provide an improved vibrating gyrometer.

According to the invention there is provided a gyrometer system for measuring the angular velocity component along an axis comprising: a frame; a conductive vibrating string stretched on said frame in a direction parallel to said axis; means for applying to said string a D.C. magnetic field perpendicular thereto; means for applying to said string an A.C. magnetic field of predetermined frequency perpendicular thereto and to said D.C. field; excitation means connected across said string for compensating the mechanical damping thereof and keeping it vibrating at its resonance frequency whereby an amplitude modulated signal is induced in the string; and modulation depth measuring means connected across said string.

For a better understanding of the invention and to show how the same may be carried into effect reference will be made to the accompanying drawings, in which.

Figure 1:
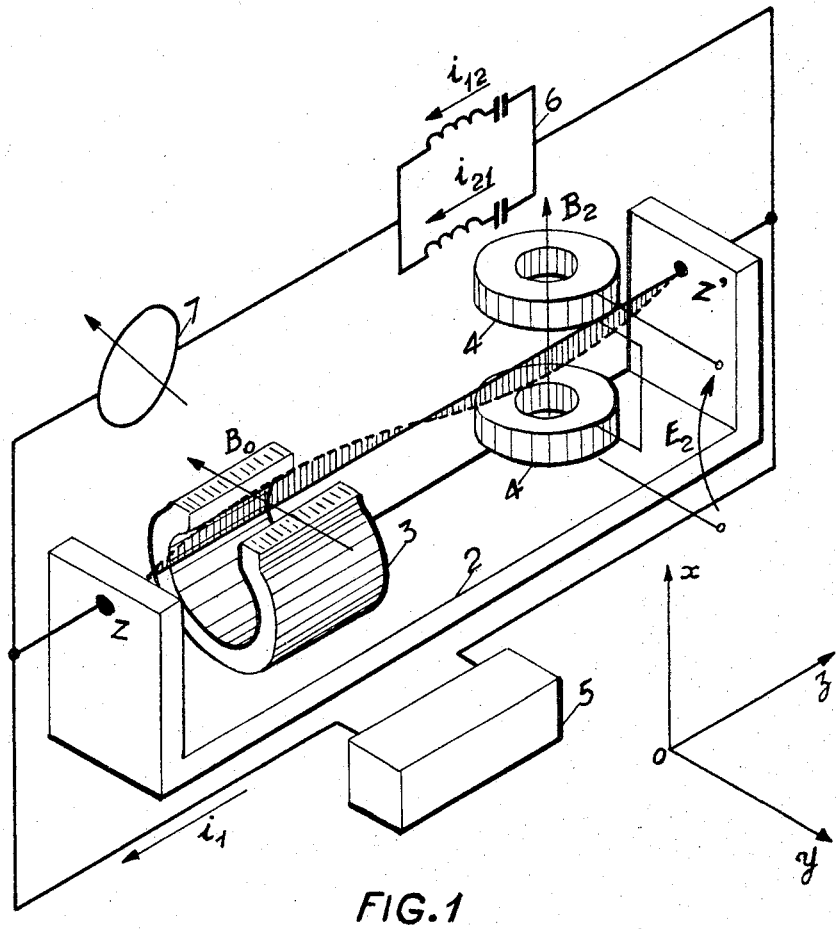
FIG. 1 is a perspective view of a gyrometer according to the invention.

FIG. 1 shows a vibrating conductor string 1, tensioned between the ends Z and Z' of a frame 2, parallel to the direction $Oz$ of the reference frame. This assembly forms the essential member of the vibrating gyrometer according to the invention. The vibrating conductor string is placed in a magnetic field $\vec{B_0}$ and carries a current $i_1$ of a frequency $f_1$. The string is thus caused to vibrate with the same frequency $f_1$. The drawing shows, by way of example, in dotted lines the deformation of the string 1, with the vibration mode corresponding to one entire wavelength. However, it is also possible to choose the half wavelength or any other vibration mode. At one of the vibration antinodes, a D.C. inductor 3 provides a magnetic induction $\vec{B_0}$ in the direction $Oy$. This inductor may be, for example, a permanent magnet located at the first vibration antinode. An A.C. inductor 4, supplied with alternating voltage $E_2$ with a frequency $f_2$, creates an alternating magnetic induction $\vec{B_2}$ in the direction $Ox$; this is localized, for example, in another vibration antinode of the string 1. The current $i_1$ flowing through the string 1 is supplied by a source 5 which supplies the energy necessary for keeping string 1 oscillating at its resonant frequency. To this end, source 5 may comprise a negative impedance $-Z_c$, for example an amplifier with a feedback, so as to meet the conditions for the self-oscillation of the vibrating string 1 by compensating any mechanical damping thereof.

According to the invention, a circuit 6 provides a selective short-circuit 6 across the string 1, as will be described later. An A.C. ammeter 7 may be provided for measuring the current flowing through circuit 6.

In the absence of any rotation of the reference frame $Oxyz$ tied to the gyrometer, a vertical force $F_M$ is applied to the string 1 which vibrates in the plane $xOz$. The assembly of string 1 and inductor 3 behaves as an electrodynamic motor, having between the terminals Z and Z' a total electrical impedance $Z_c$. When the reference frame $Oxyz$ undergoes a rotational movement with an angular velocity component directed along $Oz$, the vector product of the relative velocity of the string 1 and the angular velocity component supplies a Coriolis acceleration which results in a force $\vec{Fc}$ added to the force $\vec{F_M}$.

Figure 2:
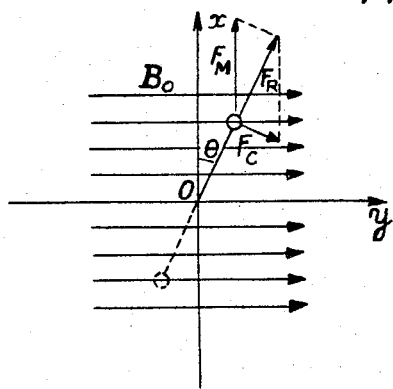
FIGS. 2 and 3 are explanatory drawings.

As may be seen from FIG. 2, the resulting force $\vec{F_R}$ which is applied to the string 1, is inclined at an angle $\theta$ to the axis $Ox$. Thus the plane of vibration of the string tends to pivot under the action of the angular velocity if $F_M$ and $Fe$ are in phase, or the string tends to describe an elliptic trajectory if $F_M$ and $Fc$ are out of phase. In order to measure this pivotal movement, the invention provides for the analysis of the voltage induced in the string 1 by the inductor 4, which is excited at the frequency $f_2$.

Figure 3:
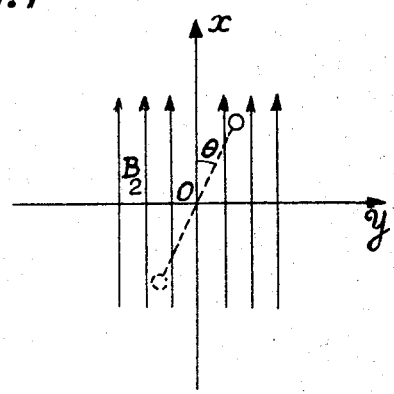

FIG. 3 shows the trace of the plane of vibration of the string 1. The string intersects at the frenquency $f_1$, the magnetic induction lines $\vec{B_2}$ and the electromotive force induced can be written as follows:

$$e_2 = k_2 \cos \cdot 2\pi f_1 t \cdot \cos 2\pi f_2 t$$

wherein $k_2$ is a function of sin $\theta$.

Similarly, the electromotive force induced by means of the inductor 3 can be written as follows:

$$e_1 = k_1 \cos 2\pi f_1 t$$

where $k_1$ is a constant factor. The total electromotive force $e_t$ induced in the string is expressed by the equation:

$$e_t = k_1\left(1 + \frac{k_2}{k_2}\cos 2\pi f_2 t\right) \cos 2\pi f_1 t$$

Figure 4:
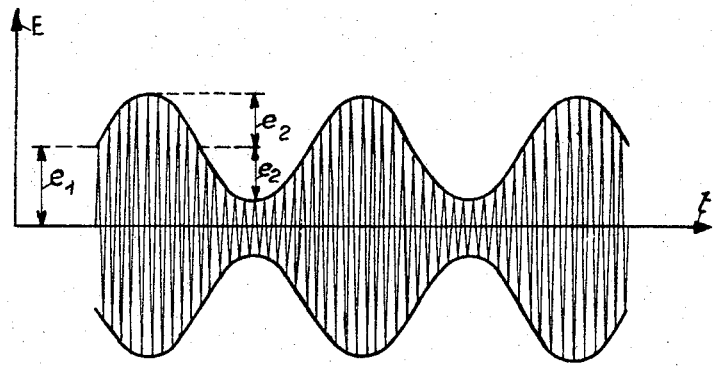
FIG. 4 shows an oscillogram of the voltage induced in the vibrating string.

The voltage $e_t$ is accordingly an amplitude modulated signal whose modulation envelope has a modulation depth which is a function of the sine of the angle of inclination $\theta$ of the plane of vibration. Such a signal is shown in FIG. 4. By way of example, a vibration frequency $f_1$ of the order of 2000 c./s. may be selected with a frequency $f_2$ of 200 c./s.

According to the invention, the electromotive force $e_2$ produces in a measuring branch the currents $i_{12}$ and $i_{21}$, corresponding, respectively, to the spectrum components $f_1+f_2$ and $f_1-f_2$ of the amplitude modulation. A reactive dipole 6, located in this branch, presents an infinite admittance for the frequencies $f_1-f_2$ and $f_1+f_2$, and a zero admittance for the frequency $f_1$. Thus the short-circuit current flowing through the ammeter 7 causes it to deviate in porportion with the pivoting of the plane of vibration of the vibrating string. The Coriolis force which tends to move the plane of vibration away from the plane $xOz$ is balanced by the force $F_M$ and mainly by the electrodynamic reaction produced in the string 1 by the currents $i_{12}$ and $i_{21}$ in accordance with Lenz's law. In the absence of rotation, these restoring forces tend to maintain the vibration of the string within a well defined plane, parallel to the alternating field $B_2$.

Figure 5:
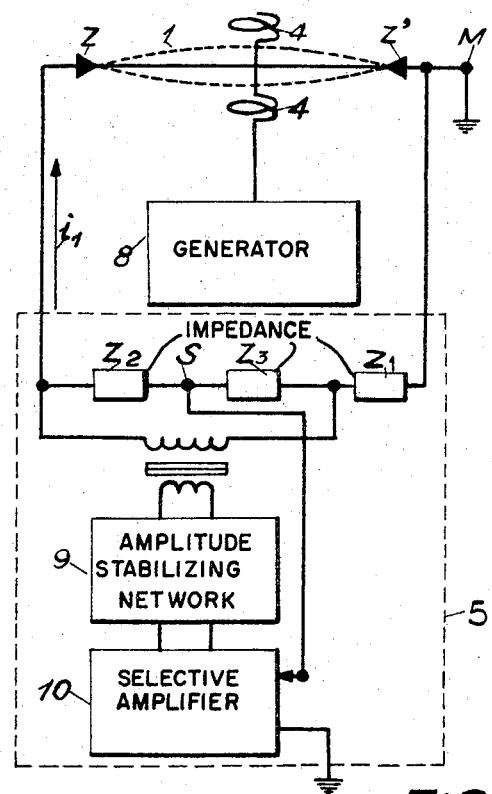
FIG. 5 is an electric diagram of a part of the arrangement according to the invention.

FIG. 5 shows diagrammatically a part of the arrangement of FIG. 1. A generator 8 supplies the inductor 4 at the frequency $f_2$. The string 1 forms with impedances $Z_1$, $Z_2$ and $Z_3$ a balanced bridge, which is supplied by a selective amplifier 10 through a non-linear amplitude stabilizing network 9. Between the ground terminal M and the output terminal S, there appears the total voltage $e_t$ induced in the vibrating string, and this voltage is fed back to the amplifier 10 which is tuned to the maintenance frequency $f_1$.

When the string vibrates, a component $e_1$ with the frequency $f_1$ appears in the induced voltage $e_t$. It is selectively amplified by the amplifier 10 and clipped by the non-linear network 9 which assures the amplitude stabilisation. An actuating current $i_1$ flows therefore through the vibrating string 1 with such an intensity and phase that the movement of the string is undamped. The other component of the voltage $e_t$ is the voltage $e_2$, induced by the inductor 4, which is supplied at the frequency $f_2$ from the generator 8. The voltage $e_t$ is an amplitude modulated wave whose carrier frequency is $f_1$ and whose modulation frequency is $f_2$. The modulation depth depends on the sine of the deviation angle $\theta$ of the plane of vibration.

The gyrometer according to the invention has the advantages of simplicity and ruggedness. The energy expense is very small and the useful life limited only by that of the electronic components, since there is no mechanical wear. The sensitivity along a measuring axis is high due to the nature of the detected effect and to the fact that the alternating induction vector is located in the plane of vibration in the absence of a gyratory effect. In addition, the device is not sensitive to parasitic accelerations, due to the use of a vibrating structure with small mass.

Of course, the invention is not limited to the embodiments described and shown which were given solely by way of example.

What is claimed, is:

1. A gyrometer system for measuring the angular velocity component along an axis comprising: a frame; a conductive vibrating string stretched on said frame in a direction parallel to said axis; means for applying to said string a D.C. magnetic field perpendicular thereto; means for applying to said string an A.C. magnetic field of predetermined frequency perpendicular thereto and to said D.C. field; excitation means connected across said string for compensating the mechanical damping thereof and keeping it vibrating at its resonance frequency whereby an amplitude modulated signal is induced in said string; and an A.C. current measuring means and an impedance in series, connected in parallel with said string, said impedance having a zero admittance at said resonance frequency and an infinite admittance at both side frequencies of said modulated signal.

2. A gyrometer according to claim 1 further comprising stabilizing means controlling said excitation means for keeping the vibration amplitude of said string constant.

3. A gyrometer system according to claim 2, wherein said excitation means comprise a bridge having four branches and two pairs of opposite junctions connecting said branches, said string forming one of said branches, said bridge being balanced with said string at rest, an amplifier having an output connected across one of said pairs of junctions and an input connected across the other pair of junctions.

References Cited

UNITED STATES PATENTS

| | | | |
|---|---|---|---|
| Re. 22,409 | 12/1943 | Lyman et al. | 73—505 XR |
| 2,479,562 | 8/1949 | Ferrill | 73—505 XR |
| 2,479,563 | 8/1949 | Ferrill | 73—505 XR |
| 2,546,158 | 3/1951 | Johnson | 73—505 XR |
| 3,046,789 | 7/1962 | Boss. | |

JAMES J. GILL, *Primary Examiner.*